(12) United States Patent
Gao et al.

(10) Patent No.: US 8,767,671 B2
(45) Date of Patent: Jul. 1, 2014

(54) SPACE DIVISION MULTIPLE ACCESS TRANSMISSION METHOD OF STATISTICAL CHARACTERISTIC MODE

(75) Inventors: Xiqi Gao, Nanjing (CN); Shi Jin, Nanjing (CN); Dongming Wang, Nanjing (CN); Jue Wang, Nanjing (CN); Xiaohu You, Nanjing (CN); Yuan Zhang, Nanjing (CN)

(73) Assignee: Southeast University, Jiangsu (CN)

( * ) Notice: Subject to any disclaimer, the term of this patent is extended or adjusted under 35 U.S.C. 154(b) by 95 days.

(21) Appl. No.: 13/395,637

(22) PCT Filed: Dec. 31, 2010

(86) PCT No.: PCT/CN2010/080637
§ 371 (c)(1),
(2), (4) Date: Mar. 12, 2012

(87) PCT Pub. No.: WO2011/160418
PCT Pub. Date: Dec. 29, 2011

(65) Prior Publication Data
US 2012/0177001 A1   Jul. 12, 2012

(30) Foreign Application Priority Data
Jun. 24, 2010   (CN) .......................... 2010 1 0210394

(51) Int. Cl.
*H04W 4/00*   (2009.01)

(52) U.S. Cl.
USPC .......................................... 370/330

(58) Field of Classification Search
None
See application file for complete search history.

(56) References Cited

U.S. PATENT DOCUMENTS

| | | | | |
|---|---|---|---|---|
| 2007/0097856 A1* | 5/2007 | Wang et al. | ................... | 370/210 |
| 2008/0181174 A1* | 7/2008 | Cho | .............. | 370/329 |
| 2010/0189189 A1* | 7/2010 | Hoshino et al. | ............... | 375/267 |
| 2010/0322223 A1* | 12/2010 | Choi et al. | .................... | 370/342 |
| 2011/0195662 A1* | 8/2011 | Seo et al. | ........................ | 455/39 |
| 2012/0099469 A1* | 4/2012 | Luo et al. | ...................... | 370/252 |

FOREIGN PATENT DOCUMENTS

| | | |
|---|---|---|
| CN | 101132214 A | 2/2008 |
| CN | 101505205 A | 8/2009 |
| CN | 101667859 A | 3/2010 |
| CN | 101882952 A | 11/2010 |

OTHER PUBLICATIONS

International Search Report, with English Translation, mailed Apr. 7, 2011, for PCT Patent Application No. PCT/CN2010/080637, 4 pages.

* cited by examiner

*Primary Examiner* — Chi Pham
*Assistant Examiner* — Raul Rivas
(74) *Attorney, Agent, or Firm* — Christie, Parker & Hale, LLP

(57) ABSTRACT

A Space Division Multiple Access transmission method based on a statistical characteristic pattern including configuring multiple receiving and transmitting antennae at a base station side into one or more antenna arrays; comparing a diagonalization performance among the unitary matrixes for a correlation matrix of subscriber channels, with a long-time statistical correlation matrix of the subscriber channels at the base station side; calculating an optimal diagonalized correlation matrix, and then performing characteristic pattern clustering for the subscribers in a cell with the space resource divisions of the subscribers; grouping the subscribers that belong to a same characteristic pattern cluster into space division subscriber groups; carrying out SDMA transmission, by the subscribers in a same space division subscriber group, with their space resource divisions; dynamically performing subscriber characteristic pattern clustering and space division subscriber grouping described above to generate updated characteristic pattern clusters for the subscribers and updated space division subscriber groups.

8 Claims, 3 Drawing Sheets

SPACE DIVISION MULTIPLE ACCESS TRANSMISSION METHOD OF STATISTICAL CHARACTERISTIC MODE

CROSS-REFERENCED TO RELATED APPLICATIONS

This application is a National Phase Patent Application and claims the priority of International Patent Application Number PCT/CN2010/080637, filed Dec. 31, 2010, which claims priority of Chinese Patent Application Number 201010210394.5, filed Jun. 24, 2010, the content of both of which are incorporated herein by reference.

TECHNICAL FIELD

The present invention relates to a multi-subscriber wireless communication system that employs multiple transmitting antennae and multiple receiving antennae, in particular to a multi-subscriber and multi-antenna Space Division Multiple Access (SDMA) wireless communication system that utilizes long-time statistical channel status information.

BACKGROUND ART

To meet the demand of future development, mobile communication systems must support high-speed grouped data transmission at a data rate as high as tens to thousands of millions bits per second. In the increasingly difficult situation of managing radio resources, it is a key research objective of the new generation mobile communication standards 3GPP LTE-Advanced (3rd Generation Partnership Project Long Term Evolution) to employ multi-input and multi-output (MIMO) wireless transmission techniques, to fully exploit and utilize space resources, and to maximize spectrum utilization and power efficiency.

In recent years, the research on the multi-subscriber MIMO wireless transmission technique has received extensive attention both in theory circles and in industrial circles. Owing to the asymmetry between uplink and downlink, multi-subscriber MIMO channels are classified into uplink multi-access channels (MAC) and downlink broadcast channels (BC). The research work is carried out in these two classifications, with focus set on the downlink broadcast channels (BC). The research on the multi-subscriber MIMO wireless transmission technique mainly centers on the scenarios in which the transient/short-time channel status information in the base station is known. Most research performed is only applicable to the scenarios of fixed and low-speed mobile communication, however some research is performed on multi-subscriber MIMO wireless transmission in middle-speed and high-speed mobile communication environments. In addition, only multi-subscriber MIMO uplink MAC transmission is considered in the research, while few reports are seen regarding the research on multi-subscriber MIMO wireless transmission methods that utilize long-time statistical channel status information. SDMA transmission that utilizes transient/short-time channel status information is not only unfit for middle-speed and high-speed mobile communication environments, but also involves complex resource scheduling at the control layer, complex implementation of the physical layer, higher cost of channel information acquisition and exchange, and higher inter-subscriber interference, and therefore it is hard to effectively improve the spectrum utilization, power utilization, and transmission reliability of the wireless communication system. For this purpose, the present invention provides a multi-subscriber SDMA technique that utilizes long-time statistical channel status information.

CONTENTS OF THE INVENTION

Technical Problem

The object of the present invention is to provide a multi-subscriber SDMA transmission method based on a statistical characteristic pattern that utilizes long-time statistical channel status information, and can perform subscriber characteristic pattern clustering, space division subscriber grouping, and SDMA transmission, according to the long-time statistical status information of subscriber channels.

Technical Solution

The object of the present invention is to provide a multi-subscriber SDMA transmission method based on statistical characteristic pattern that utilizes long-time statistical channel status information, the method comprising:
  a) configuring the receiving and transmitting multi-antenna at the base station side into one or more antenna arrays, and dividing multiple space resources for each antenna array by way of multiple unitary matrixes;
  b) comparing the diagonalization performance among the unitary matrixes for the correlation matrix of subscriber channels, with the long-time statistical correlation matrix of the subscriber channels at the base station side, in order to determine the unitary matrix that matches the characteristic pattern of the long-time statistical correlation matrix, then calculating the optimal diagonalized correlation matrix, so as to determine the space resource divisions for the subscribers and the space directions occupied by the subscribers in the divisions, and then performing characteristic pattern clustering for the subscribers in the cell with the space resource divisions of the subscribers;
  c) grouping the subscribers that belong to the same characteristic pattern cluster into space division subscriber groups, on the basis of the space directions occupied by each subscriber, to create one or more space division subscriber groups that can share the same time-frequency resource by way of the SDMA technique, wherein, different subscribers in each space division subscriber group occupy specific space directions different from the directions occupied by other subscribers in the group;
  d) carrying out SDMA transmission, by the subscribers in the same space division subscriber group, with their space resource divisions, wherein, each subscriber performs SDMA transmission in the long-time statistical characteristic pattern transmission by way of one or more column vectors in the corresponding unitary matrix, and wherein the signals transmitted by each subscriber in the long-time statistical characteristic pattern comprise special pilot signals and data signals, and the data signals can be signals generated by short time pre-coding with the short-time channel information;
  e) dynamically performing, subscriber characteristic pattern clustering and space division subscriber grouping as described above, performed dynamically as the long-time statistical characteristics of the channels between the base station and the subscribers change with the movement of the subscribers, to generate updated characteristic pattern clusters for the subscribers and updated space division subscriber groups, and to thereby carry out the SDMA transmission in the characteristic pattern described above.

In the antenna arrays, the interval between antennae in the antenna array is smaller than the carrier wavelength; if the antennae are omni-directional antennae, sector antennae with 120 degree angles, or sector antennae with 60 degree angles, then the interval between antennae is ½ wavelength, $1/\sqrt{3}$ wavelength, or 1 wavelength, respectively; each antenna is a mono-polar antenna or multi-polar antenna; the interval between antenna arrays is greater than the carrier wavelength; and the directional diagrams of all antennae in all antenna arrays are aligned to each other.

In the unitary matrix, each column vector corresponds to a space direction, and can be used as a weighted vector for transmitting/receiving information for the antennae, so as to implement transmitting/receiving in the corresponding space direction; the vectors in each unitary matrix can implement transmitting/receiving in space directions orthogonal to each other on the same time-frequency resource, so as to implement division and utilization of space resources; different unitary matrixes correspond to different space resource divisions; and the unitary matrixes for the space resource division are generated by pre-multiplying the Discrete Fourier Transform matrix with a diagonal matrix.

The diagonalization performance is compared among the unitary matrixes for the correlation matrix of subscriber channels, and the space resource division corresponding to the unitary matrix with the optimal diagonalization performance is the space resource division that matches the characteristic pattern of the subscribers. The space directions corresponding to one or more diagonal elements greater than a predefined threshold in the correlation matrix after optimal diagonalization, are the space directions occupied by the subscriber. Subscribers that belong to the same space resource division are clustered into the same subscriber characteristic pattern cluster, and thereby multiple subscriber clusters are formed in the corresponding long-time statistical time window for all subscribers in the cell.

The determination of space resource divisions for the subscribers and space directions occupied by the subscribers are implemented either at the base station side or at the subscriber terminal side. In the case of implementation at the base station side, the required long-time statistical correlation matrix of the subscriber channels at the base station side is either calculated and obtained by way of estimation of the corresponding uplink channel, or estimated by the subscriber terminal by way of estimation of the common pilot channel, and is then fed back to the base station directly through the feedback link. In the case of implementation at the subscriber terminal side, the subscriber calculates the long-time statistical correlation matrix of the channels at the base station side by way of estimation of the common pilot channel, and thereby calculates the space resource division for the subscriber and the space directions occupied by the subscriber, and then feeds back the information to the base station through the feedback link.

The space division subscriber grouping is carried out with a greedy algorithm, according to the space directions occupied by each subscriber. For each space division subscriber group, subscribers that occupy more space directions are grouped in precedence, and then other subscribers that can be grouped are searched for according to the number of space directions occupied, in a more-to-less order. If the space directions occupied by the subscriber that is searched for, currently have no overlap with the space directions occupied by any existing subscriber in the group, then that subscriber will be included into the group. The searching then continues until all space directions in the group are occupied, or all subscribers have been searched through.

The special pilot signals of the subscribers can be transmitted directly in the long-time characteristic pattern, while the data signals of the subscribers can be further generated by short-time pre-coding with short-time channel information. For downlink transmission, the transmitted signals of the subscribers at the base station side are long-time pre-coded with one or more corresponding column vectors to generate transmitted signals in the antenna domain, and the signals of the same space division subscriber group in the antenna domain is the sum of the signals of the subscribers in the antenna domain. For uplink transmission, the subscriber performs matching operation for the received signals in the antenna domain at the base station side with one or more corresponding column vectors to abstract the received signals of the subscriber, and then carry out subsequent receiving operations.

The signal transmission for each subscriber in the long-time statistical characteristic pattern can be carried out in all space directions occupied by the subscriber, or carried out in some space directions occupied by the subscriber. The space directions are selected from higher diagonal elements in a quantity not higher than a predefined number from the diagonal elements in the channel correlation matrix after optimal diagonalization. Then, the space directions corresponding to the selected diagonal elements can be used as the space directions for signal transmission in the long-time statistical characteristic pattern. The space directions can be selected at the base station side, or selected at the subscriber terminal side, and then notified to the base station through the feedback link.

Beneficial Effects

The SDMA transmission method based on the statistical characteristic pattern provided in the present invention has the following advantages:

A specific uneven-interval multi-antenna configuration and an appropriate space resource division are employed, favorable for acquiring the performance gain of the multi-subscriber SDMA technique and the performance gain of multi-antenna transmission for the subscribers.

SDMA is implemented by utilizing the long-time statistical channel status information of each subscriber channel, and the subscribers can determine the space resources to use and then notify the information to the base station by themselves, thus the complexity in resource scheduling at the control layer and the complexity in implementation of the physical layer can be reduced greatly.

The required long-time statistical channel status information of the subscriber channels can be obtained by way of sparse pilot signals and a low-speed feedback channel, thus the cost of channel information acquisition and exchange can be reduced greatly.

In the SDMA transmission mode, the subscribers can further use short-time channel status information for transmission, so as to improve the transmission performance, consequently the spending of required special pilot channel is low.

The method in the present invention is helpful for suppressing the inter-subscriber interference effectively, and can overcome the drawback of sensitivity to time-related channel variations in existing multi-subscriber wireless transmission systems that are based on short-time channel status information, therefore the method is highly adaptive to various mobile environments.

The method provided in the present invention effectively improves the spectrum utilization, power utilization, and transmission reliability of wireless communication systems.

DESCRIPTION OF THE DRAWINGS

In order to more clearly explain the technical solution in the embodiments of the present invention, provided below are drawings used in the description of the embodiments or of the prior art. As will become apparent, the drawings described below only illustrate some embodiments of the present invention. Those skilled in the art can obtain drawings of other embodiments on the basis of these drawings without creative labor.

DETAILED DESCRIPTION OF THE EMBODIMENTS

For better understanding of the technical solution of the present invention, hereunder the technical solution in the embodiments of the present invention will be described clearly and completely with reference to the accompanying drawings. As will become apparent, the embodiments described below contain some, but not all embodiments of the present invention. Those skilled in the art can obtain other embodiments without creative labor, on the basis of the embodiments provided here; however, all these embodiments shall be deemed as falling into the protection scope of the present invention.

Figure 1:
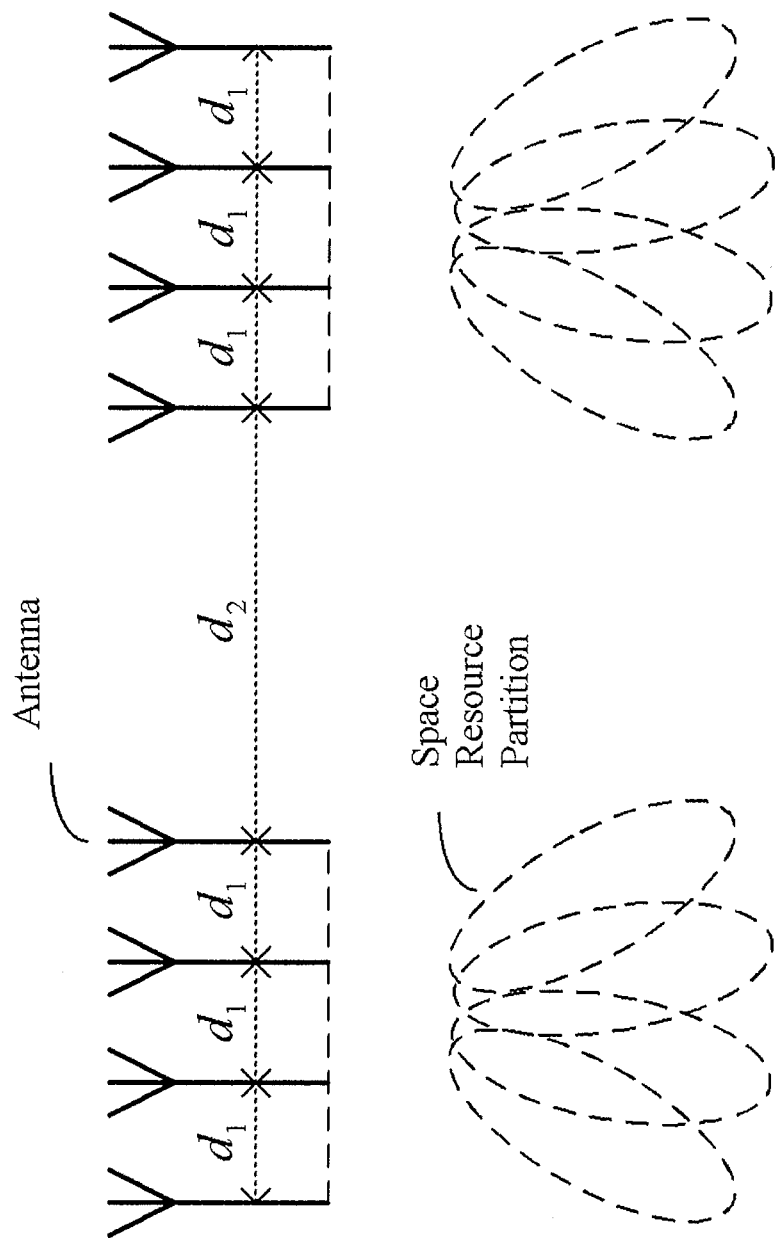
FIG. 1 is a schematic diagram of a multi-antenna configuration and a space resource division in a base station.

(1) Multi-Antenna Configuration and Space Resources Division in Base Station:

FIG. 1 is a schematic diagram of a multi-antenna configuration and a space resource division in a base station, wherein, the multi-antenna configuration is shown in the upper part. The receiving and transmitting multiple-antennae at the base station side are configured into one or more antenna arrays; here, an antenna array specially refers to a group of antennae arranged at a small interval. The antennae shown in FIG. 1 are configured into two antenna arrays, each of which has four antennae. The interval between the antennae in each antenna array in the Figure is denoted as $d_1$, which is smaller than the carrier wavelength. The carrier wavelength is denoted as $\lambda$, for omnidirectional antennae, sector antennae with 120 degree angles, and sector antennae with 60 degree angles, the value of $d_1$ is $\frac{1}{2}\lambda \times$wavelength, $1/\sqrt{3}\lambda\times$wavelength, and $\lambda\times$wavelength, respectively. The interval between the two antenna arrays shown in the Figure is denoted as $d_2$, which is greater than carrier wavelength $\lambda$, i.e., $d_2 = c\lambda$, and $c > 1$. Typically, the antennae are aligned into linear arrays, and the directional diagrams of all antennae are aligned. Each antenna can be a mono-polar antenna or multi-polar antenna; when multi-polar antennae are used, the number of antenna arrays is considered as a multiple of the number of polarization directions, for the purpose of convenience. The number of antenna arrays is denoted as $M_1$, and the number of antennae in each antenna array is denoted as $M_2$, and the total number of antennae deployed in the base station is $M = M_1 M_2$.

To implement SDMA, the space resources must be divided effectively, and multiple space directions must be resolved, so that they can be used. To that end, for each antenna array, transmitted signals in the antenna domain are generated by way of multiple unitary matrixes, or received signals in antenna domain are received and pretreated in the present invention, to form multiple space resource divisions. For example, in the case of sector antennae with 120 degree angles, the space directions in a typical space resource division are shown in the lower part of FIG. 1.

A given set of unitary matrixes is denoted as $U = \{U_v, v=0, 1, \ldots V-1\}$, where, $U_v$ is the unitary matrix v, and V is the number of unitary matrixes. A sub-matrix composed of one or more column vectors within $U_v$ is denoted as $U_v^\alpha$, where, the labels of the columns are defined by the values of elements in the set $\alpha$. The column vector l in the unitary matrix v is denoted as $u_v^l$. Each column vector in a unitary matrix corresponds to a space direction, and can be used as a weight vector for transmitting/receiving information for the antenna, in order to implement transmitting/receiving in the corresponding space direction. The signals transmitted from the antenna array $m_1$ in the base station via the column vector l in the unitary matrix v is denoted as $s_{v,l}^{m_1}(n)$, where, n represents the $n^{th}$ time-frequency resource, which can be a single sub-carrier for either a single OFDM symbol in an Orthogonal Frequency Division Multiplexing (OFDM) system, or a single transmission symbol in a single-carrier system. The signal vector in antenna domain transmitted from antenna array $m_1$ is:

$$x^{m_1}(n) = u_v^l s_{v,l}^{m_1}(n) \tag{1}$$

Where, $m_1 = 1, 2, \ldots M_1$, and the number of dimensions of $x^{m_1}(n)$ is $M_2$. The signal vector in the antenna domain received by the antenna array $m_1$ in the base station is denoted as $y^{m_1}(n)$, then, the signals obtained from the antenna array $m_1$ in the base station via the column vector l in the unitary matrix v is:

$$\hat{s}_{v,l}^{m_1}(n) = (u_v^l)^H y^{m_1}(n) \tag{2}$$

Where, superscript H represents conjugate transposition. The vectors in each unitary matrix can be used to implement transmitting/receiving in space directions that are orthogonal to each other on the same time-frequency resource, and can thereby implement division and utilization of space resources. Different unitary matrixes correspond to different space resource divisions. For example, in the case of space resource division v, if a group of space directions $\{l_1, l_2, \ldots, l_{M'_2}\}$ is utilized at the same time for transmission on the same time-frequency resource (where, $M'_2 \leq M_2$), then the signal vector in the antenna domain transmitted in the base station and the signals in the space directions received and obtained in the base station can be denoted as:

$$x^{m_1}(n) = U_v^\alpha s_v^{m_1}(n) \tag{3}$$

$$\hat{s}_v^{m_1}(n) = (U_v^\alpha)^H y^{m_1}(n) \tag{4}$$

where, $$\alpha = \{l_1, l_2, \ldots l_{M'_2}\}$$

$$s_v^{m_1}(n) = [s_{v,l_1}^{m_1}(n) s_{v,l_2}^{m_1}(n) \ldots s_{v,l_{M'_2}}^{m_1}(n)]^T$$

$$\hat{s}_v^{m_1}(n)[\hat{s}_{v,l_1}^{m_1}(n) \hat{s}_{v,l_2}^{m_1}(n) \ldots \hat{s}_{v,l_{M'_2}}^{m_1}(n)]^T_o$$

In formulas (3) and (4), if $M'_2 = M$, then $U_v^\alpha = U_v$.

In the case when the antennae are aligned into linear arrays and the intervals between the antennae meet the requirement described above, the unitary matrixes for space resource division can be generated by left-multiplying the Discrete Fourier Transformation (DFT) matrix with a diagonal matrix. A DFT matrix with $M_2$ points is denoted as F, then, the element (k,l) in F is $[F]_{k,l} = e^{-j2\pi kl/M_2}/\sqrt{M_2}$, and the $v^{th}$ unitary matrix $U_v$ can be selected as:

$$U_v = \Gamma_v F \tag{5}$$

Where, $\Gamma_v$ is a diagonal matrix, in which the $l^{th}$ diagonal element is $e^{-j2\pi vl/M_2/V}$.

(2) Subscriber Characteristic Pattern Clustering:

The number of subscribers in the cell is denoted as K, the number of antennae configured for subscriber k is denoted as $N_k$, and the channel matrix between the base station and the subscriber k on the time-frequency resource n is denoted as $H_k(n)$, which is in size of $N_k \times M$, then, the statistical correlation matrix of the subscriber channels at the base station side is $R_k = E\{H_k^H(n)H_k(n)\}$, where, $E\{.\}$ represents expectation operation. Since the subscribers are mobile ones, $R_k$ varies with the time; however, the time scale of variation is large, and can be estimated with selected channel samples within a specific time window. The set of labels of time-frequency resources for selected channel samples with a specific time window is denoted as $N_c$, then, $R_k$ can be estimated with the following formula or an improved variant of the formula:

$$R_k \approx \sum_{n \in N_c} H_k^H(n) H_k(n) \quad (6)$$

The characteristic matrix of $R_k$ is denoted as $V_k$, the characteristic value i of $R_k$ is denoted as $\lambda_{k,i}$, i.e., $R_k = V_k \Lambda_k V_k^H$, where, $\Lambda_k$ is a diagonal matrix, with diagonal element i as $\lambda_{k,i}$. The column vectors of $V_k$ represent the characteristic directions of subscriber channel k at the base station side, and are referred to as characteristic patterns; whereas $\lambda_{k,i}$ represents the channel intensity in characteristic pattern i. Since the antenna arrays are arranged at a large interval or are different from each other in terms of polarization direction, and the directional diagrams are aligned to each other, the correlation matrix $R_k$ can be approximately modeled as a block diagonal matrix with block matrixes in the diagonal line identical to each other, and can be denoted as $\overline{R}_k$, in size of $M_2 \times M_2$. $\overline{R}_k$ can be estimated with the following formula:

$$\overline{R}_k \approx \frac{1}{M_1} \sum_{l=0}^{M_1-1} R_k^{(l)} \quad (7)$$

Where, $R_k^{(l)}$ represents the diagonal sub-matrix l of matrix $R_k$, in size of $M_2 \times M_2$.

With the long-time statistical correlation matrix of subscriber channels at the base station side, both the space resource division that matches the characteristic pattern best and the space directions occupied in the division can be determined. To that end, for the subscribers, first, V matrices $A_{k,v}$ are calculated with the following formula:

$$A_{k,v} = U_v^H \overline{R}_k U_v \quad (8)$$

Then, $v^*_k$ is calculated with the following formula:

$$v^*_k = \underset{v}{\operatorname{argmin}} \sum_{i=0}^{M_2-1} \sum_{\substack{j=0 \\ j \neq i}}^{M_2-1} |[A_{k,v}]_{i,j}|^2 \quad (9)$$

Wherein, $[A_{k,v}]_{i,j}$ represents element (i,j) in $A_{k,v}$, and $$\underset{v}{\operatorname{argmin}} f(v)$$

represents the v that makes f(v) minimal. Based on these formulas, it can be determined that within the V unitary matrixes, the $v^*_k{}^{th}$ unitary matrix $U_{v^*_k}$ has the best diagonalization performance for the correlation matrix of subscriber channel k; accordingly, the space resource division $v^*_k$ is the space resource division that matches the subscriber characteristic pattern k. Finally, the values of the diagonal elements in $A_{k,v^*_k}$ are compared to see if they are greater than a predefined threshold $\epsilon$; if the value of diagonal element i is greater than $\epsilon$, it can be judged that the space direction i in the space resource division $v^*_k$ is occupied by subscriber k, and can represent the set of space directions occupied by k with $I_k$.

The $v^*_k$ and $I_k$ described above can be implemented at the base station or at the subscriber terminal. In the case when they are implemented at the base station side, the required $\overline{R}_k$ can be either calculated and obtained by way of estimation of corresponding uplink channels, or estimated by the subscriber terminals by way of estimation of common pilot channel, and is then fed back to the base station directly through the feedback link. In the case when they are implemented at the subscriber terminal side, the subscriber calculates the long-time statistical correlation matrix at the base station side by way of estimation of the common pilot channel, and thereby calculates $v^*_k$ and $I_k$, and feeds back them to the base station through the feedback link.

Characteristic pattern clustering is performed for the subscribers in the cell, with the space resource divisions of the subscribers. Subscribers that belong to the same space resource division are clustered into the same characteristic pattern cluster, i.e., if $v^*_k = v$, the subscriber k will be included into cluster v. The V subscriber clusters are formed for all subscribers in the cell in the corresponding long-time statistical time window.

(3) Space Division Subscriber Grouping:

The subscribers that are of the same characteristic pattern cluster are organized into space division subscriber groups, with the space directions occupied by each subscriber, in order to create one or more space division subscriber groups that can share the same time-frequency resource by way of the SDMA technique, wherein, different subscribers in each space division subscriber group occupy specific space directions different from the directions occupied by other subscribers in the group.

Space division subscriber grouping is carried out on the basis of the set $I_k$ of space directions occupied by the subscribers, and can be implemented with a greedy algorithm. For each space division subscriber group, subscribers that occupy more space directions are grouped in precedence, and then other subscribers that can be grouped are searched for according to the number of space directions occupied, in a more-to-less order. If the space directions occupied by the subscriber that is searched for, currently have no overlap with the space directions occupied by any existing subscriber in the group, then that subscriber will be included into the group. The searching then continues until all space directions in the group are occupied, or all subscribers have been searched through.

In the characteristic pattern v, for example, the set of subscribers that are of the characteristic pattern cluster is denoted as $K_v = \{k_{v,1}, k_{v,2}, \ldots, k_{v,N_v}\}$, where, $N_v$ is the number of subscribers that are of the cluster, $k_{v,n}$ represents the subscriber label, and $I_{k_{v,n}}$ is the set of corresponding space directions occupied by the subscriber. The set $K_v$ is divided into $M_2$ subsets according to the number of space directions (i.e., length of $I_{k_{v,n}}$) occupied by the subscribers, and the subset m is denoted as $K_{v,m}$, $K_{v,m} = \{k_{v,m,1} \ldots k_{v,m,N_{v,m}}\}$, where, $N_{v,m}$ is the number of subscribers in the subset, $$\sum_{m=1}^{M_2} N_{v,m} = N_v, \text{ and } \bigcup_{m=1}^{M_2} K_{v,m} = K_v.$$

All subscriber groups in the space resource division after grouping is denoted as $K_v^{(g)} = \{K_{v,j}^{(g)}, j=1 \ldots N_{groups}\}$, where, $N_{groups}$ is the number of subscriber groups, and $K_{v,j}^{(g)}$ is the set of subscriber labels in subscriber group j. The set of all space direction IDs is denoted as $S=\{1, 2, \ldots, M_2\}$. In that characteristic pattern cluster, the space division subscriber grouping can be accomplished through the following steps:

Step 1: Group the subscribers that belong to the subset $K_{v,M_2}$ into a separate group, i.e., $K_{v,j}^{(g)} = \{k_{v,M_2,j}\}$, and j=1, 2, ... $N_{v,M_2}$. Initialize: $K_v^{(g)} = \{K_{v,j}^{(g)}, j=1, 2, \ldots, N_{v,M_2}\}$, and J= $N_{v,M_2}+1$.

Step 2: Search for and find a non-empty set $K_{v,m}$, from $m=(M_2-1)$ to 1, and select subscriber $k_{v,m,1}$ from the non-empty set as the first subscriber to be included into a group. Initialize intermediate set variables $I_{temp} = I_{k_{v,m,1}}$, $K_{v,J}^{(g)} = \{k_{v,m,1}\}$, and delete subscriber $k_{v,m,1}$ from $K_{v,m}$.

Step 3: Denote the number of space directions in $I_{temp}$ as $m_{temp}$. If $m_{temp} \geq M_2/2$, then initialize $m'=M_2-m_{temp}$; if $m_{temp}<M_2/2$, then initialize $m'=m_{temp}$. Where, m' is the label of subset to be searched for.

Step 4: Select subscribers from $K_{v,m'}$ and add them into $K_{v,J}^{(g)}$ in descending order of m'. If $\exists k_{v,m',i} \in K_{v,m'}$, set $I_{k_{v,m'i}} \cap I_{temp} = \emptyset$, update $I_{temp} = I_{k_{v,m',i}} \cup I_{temp}$, $K_{temp}^{(g)} = K_{temp}^{(g)} \cup \{k_{v,m',i}\}$, and delete subscriber $k_{v,m',i}$ from $K_{v,m'}$; otherwise go to Step 6.

Step 5: If $I_{temp}=S$, then go to Step 6; otherwise update m'=min (m', $M_2-m_{temp}$) and return to Step 4 and repeat the cycle.

Step 6: Set $K_v^{(g)} = K_v^{(g)} \cap \{K_{v,J}^{(g)}\}$. If all subscribers in $K_v$ are grouped, then terminate the grouping cycle; otherwise set J=J+1, and return to Step 2 and repeat the cycle.

(4) SDMA Transmission:

The subscribers in the same space division subscriber group utilize their space resource divisions to carry out SDMA transmission, and the subscribers carry out signal transmission in the long-time statistical characteristic pattern by way of one or more column vectors in the corresponding unitary matrix. The signal transmission in the long-time statistical characteristic pattern for each subscriber can be implemented in all space directions or in some selected space directions occupied by the subscribers.

The set of subscribers in a space division subscriber group is denoted as $K=\{k_1, k_2, \ldots, k_G\}$, where, G represents the number of subscribers, and $k_g$ represents the subscriber label. Since the space directions occupied by the subscribers have no overlap with each other, $$\bigcap_{k \in K} I_k$$

is an empty set. Suppose the subscriber group belongs to space resource division v, i.e., $v^*_k = v$ for $k \in K$. For subscriber k, suppose the selected transmission directions as $\alpha_k \subset I_k$. Diagonal elements in a quantity not greater than a predefined threshold can be selected from $A_{k,v^*_k}$, and the set of corresponding space directions is $\alpha_k$. The set $\alpha_k$ can be selected at the base station side, or selected at the subscriber terminal side and then can be notified to the base station through the feedback link.

Figure 2:
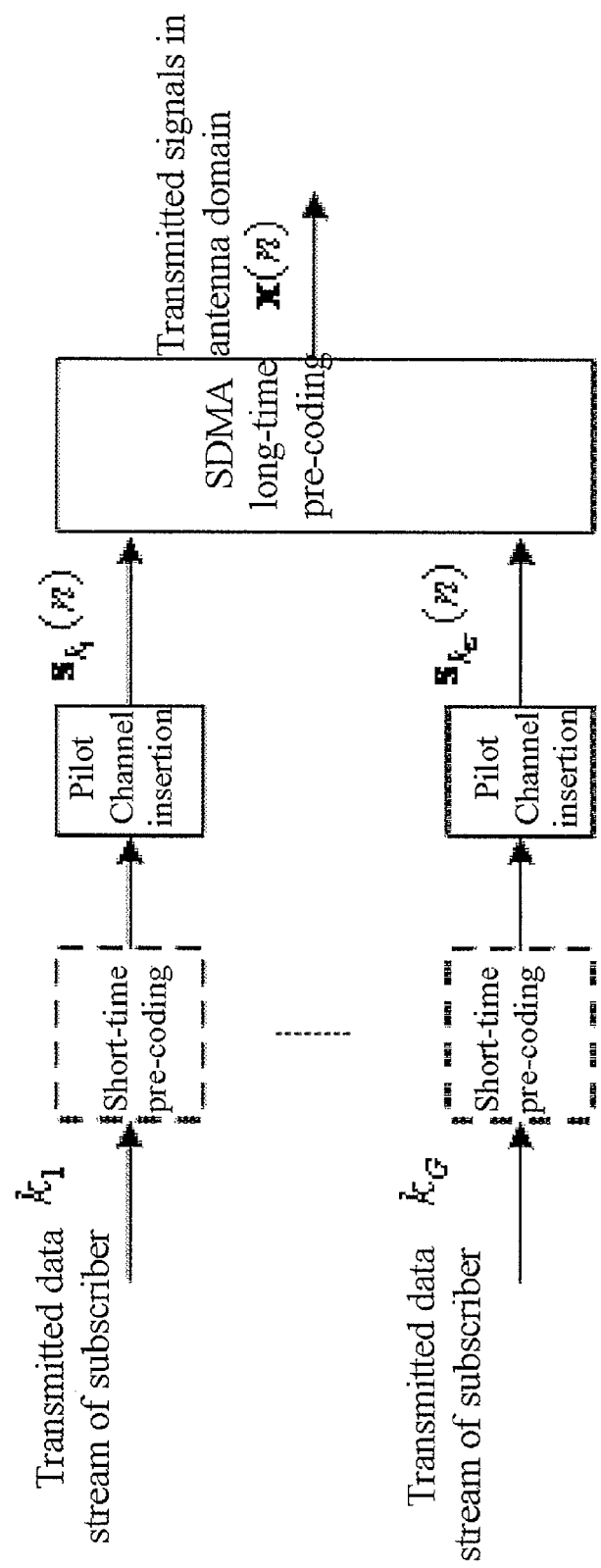
FIG. 2 is a schematic diagram of generation of transmitted signals in an SDMA downlink in a base station.

FIG. 2 is a schematic diagram of generation of transmitted signals in SDMA downlink in base station. The transmitted signals in the antenna domain in the base station are the sum of transmitted signals in the antenna domain of the SDMA subscribers, i.e.:

$$x(n) = \sum_{k \in K} x_k(n) \qquad (10)$$

Where, $x_k(n)$ represents the transmitted signals in antenna domain of subscriber k, and can be generated by long-time pre-coding with $U_v^{\alpha_k}$ and with the following formula:

$$x_k(n) = \left[(x_k^0(n))^T (x_k^1(n))^T \ldots (x_k^{M_1-1}(n))^T\right]^T \qquad (11)$$
$$= (I_{M_1} \otimes U_v^{\alpha_k}) s_k(n)$$

Where, $s_k(n)$ is the transmitted signal vector of subscriber k, $\otimes$ represents direct product operation, and $I_{M_1}$ represents the identical matrix of $M_1 \times M_1$. The transmitted signal vector $s_k(n)$ contains special pilot signals and data signals of subscriber k, and the data signals can be further generated by short-time pre-coding with short-time channel information.

Figure 3:
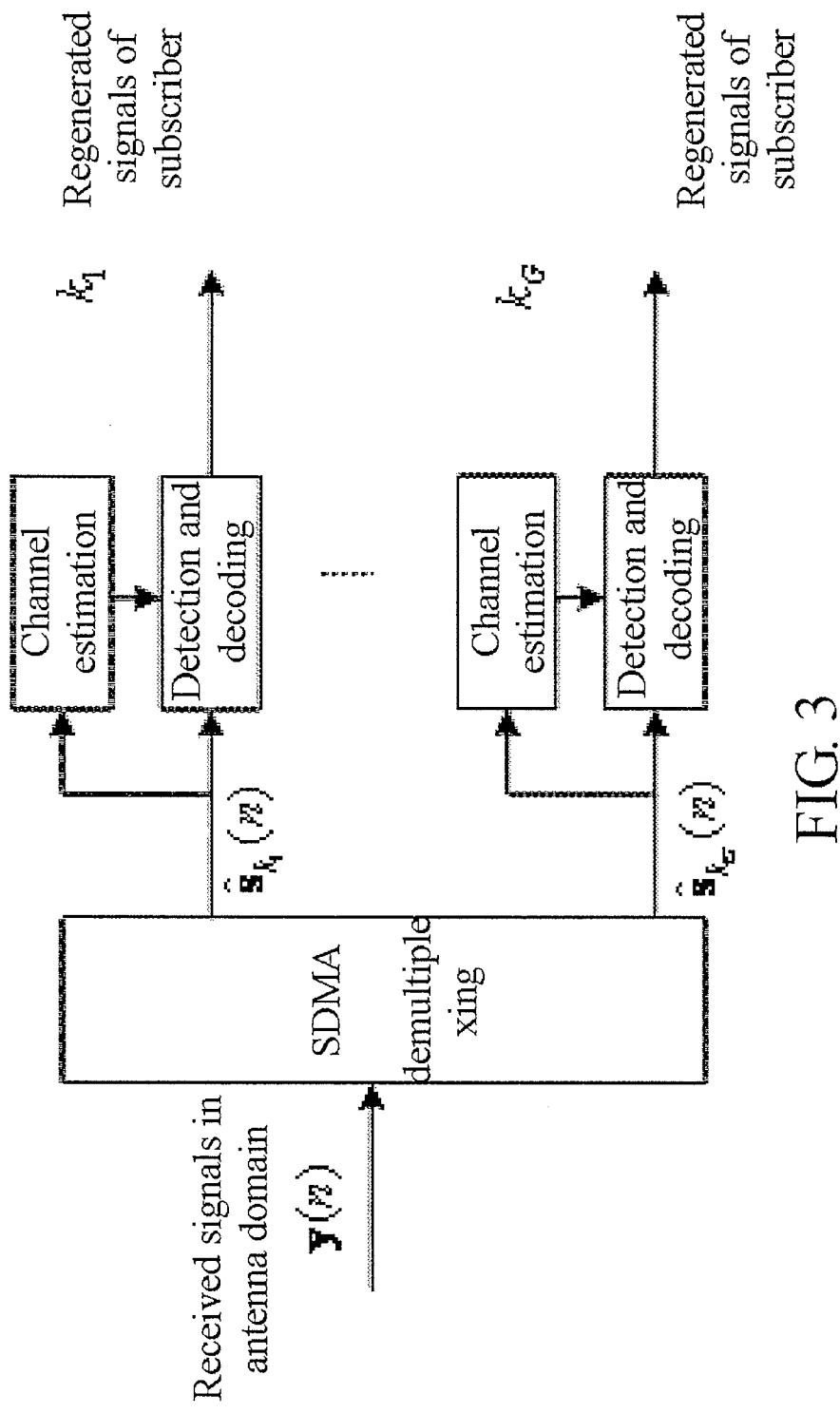
FIG. 3 is a schematic diagram of processing of received signals in an SDMA uplink in a base station.

FIG. 3 is a schematic diagram of the processing of received signals in the SDMA uplink in the base station. The received signals y(n) in the antenna domain in the base station are demultiplexed by an SDMA demultiplexer into the signals $\hat{s}_k(n)$, $k \in K$ of the subscribers in corresponding space directions. The calculation formula is:

$$\hat{s}_k(n) = (I_{M_1} \otimes U_v^{\alpha_k})^H y(n) \qquad (12)$$

The signals $\hat{s}_k(n)$ can contain special pilot signals and data signals, and therefore subsequent receiving treatments, such as channel estimation, detection, and decoding, etc., can be performed.

(5) Subscriber Scheduling and Dynamic Adjustment of Multiple Access Transmission:

Subscriber scheduling operations described above, including subscriber characteristic pattern clustering for the subscribers and space division subscriber grouping, can then be performed as the long-time statistical characteristics $R_k$ of the channels between the base station and the subscribers change with the movement of the subscribers. These operations are performed in order to generate updated subscriber classes of characteristic pattern and updated space division subscriber groups, and thereby carry out the SDMA transmission in the characteristic pattern described above. The long-time statistical characteristics vary, depending on the application scenario. Typically, the statistical time window for the long-time pre-coding technique is several to tens of times of the time window for transmission with short time pre-coding technique, and both the acquisition and exchange of relevant channel statistical information is carried out in a large time span.

In the embodiments of the present invention, it should be appreciated that the method disclosed can be implemented in other ways, without departing from the spirit and scope of the present invention. The embodiments provided here are only exemplary, and shall not be deemed as constituting any limitation to the present invention, and the content described shall not be deemed as constituting any limitation to the object of the patent application. For example, a plurality of units or components can be combined or integrated into another system, or some features can be omitted, or excluded from the execution.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

The invention claimed is:

1. A Space Division Multiple Access (SDMA) transmission method based on a statistical characteristic pattern, comprising:
   a) configuring multiple receiving and transmitting antennae at a base station side into one or more antenna arrays, and
   dividing multiple space resources for each antenna array by way of multiple unitary matrixes;
   b) comparing, at the base station side, a diagonalization performance among the unitary matrixes for a correlation matrix of subscriber channels with a long-time statistical correlation matrix of the subscriber channels in order to determine the unitary matrix that matches the characteristic pattern of the long-time statistical correlation matrix,
   then calculating an optimal diagonalized correlation matrix so as to determine the space resource divisions for the subscribers and space directions occupied by the subscribers in the divisions, and
   then performing characteristic pattern clustering for the subscribers in a cell with the space resource divisions of the subscribers;
   c) grouping the subscribers that belong to a same characteristic pattern cluster into space division subscriber groups on the basis of the space directions occupied by each subscriber to create one or more space division subscriber groups that can share a same time-frequency resource by way of a SDMA technique,
   wherein different subscribers in each space division subscriber group occupy specific space directions different from the directions occupied by other subscribers in the group;
   d) carrying out SDMA transmission, by the subscribers in a same space division subscriber group, with their space resource divisions,
   wherein each subscriber performs SDMA transmission in a long-time statistical characteristic pattern, by way of one or more column vectors in the corresponding unitary matrix, and
   wherein the signals transmitted by each subscriber in the long-time statistical characteristic pattern comprises special pilot signals and data signals, and
   the data signals can be signals generated by short time pre-coding with a short-time channel information;
   e) dynamically performing, at the base station side, subscriber characteristic pattern clustering and space division subscriber grouping as described above,
   performed dynamically as the long-time statistical characteristics of the channels between the base station and a subscribers change with a movement of the subscribers to generate updated characteristic pattern clusters for the subscribers and updated space division subscriber groups, and
   to thereby carry out the SDMA transmission in the characteristic pattern described above.

2. The SDMA transmission method based on the statistical characteristic pattern according to claim 1, wherein, the interval between antennae in the antenna array is smaller than a carrier wavelength; if the antennae are omnidirectional antennae, sector antennae with 120 degree angles, or sector antennae with 60 degree angles, then the spacing between antennae is ½ wavelength, $1/\sqrt{3}$ wavelength, or 1 wavelength, respectively; each antenna is a mono-polar antenna or multi-polar antenna; the interval between antenna arrays is greater than the carrier wavelength; and the directional patterns of all antennae in all antenna arrays are aligned to each other.

3. The SDMA transmission method based on the statistical characteristic pattern according to claim 1, wherein, in the unitary matrix, each column vector corresponds to a space direction, and can be used as a weight vector for transmitting/receiving information for the antennae, so as to implement transmitting/receiving in the corresponding space direction; the vectors in each unitary matrix can implement transmitting/receiving in space directions that are orthogonal to each other on a same time-frequency resource, so as to implement division and utilization of space resources; different unitary matrixes correspond to different space resource divisions; and the unitary matrixes for the space resource division are generated by pre-multiplying a Discrete Fourier Transform (DFT) matrix with a diagonal matrix.

4. The SDMA transmission method based on the statistical characteristic pattern according to claim 1, wherein, the diagonalization performance is compared among the unitary matrixes for the correlation matrix of subscriber channels; the space resource division corresponding to the unitary matrix with an optimal diagonalization performance is the space resource division that matches the characteristic pattern of the subscribers; the space directions corresponding to one or more diagonal elements greater than a predefined threshold in the correlation matrix after optimal diagonalization, are the space directions occupied by the subscriber; subscribers that belong to the same space resource division are included into the same subscriber characteristic pattern cluster, and thereby multiple subscriber clusters are formed in the corresponding long-time statistical time window for all subscribers in the cell.

5. The SDMA transmission method based on the statistical characteristic pattern according to claim 1, wherein, the space resource divisions for the subscribers and space directions occupied by the subscribers are determined and implemented at the base station side or at a subscriber terminal side; in the case of implementation at the base station side, the required long-time statistical correlation matrix of the subscriber channels at the base station side is either calculated and obtained by way of estimation of the corresponding uplink channel, or estimated by a subscriber terminal by way of estimation of the common pilot channel, and is then fed back to the base station directly through the feedback link; in the case of implementation at the subscriber terminal side, the subscriber calculates the long-time statistical correlation matrix of the channels at the base station side by way of estimation of a common pilot channel, and thereby calculates the space resource division for the subscriber and the space directions occupied by the subscriber, and then feeds back the information to the base station through a feedback link.

6. The SDMA transmission method based on the statistical characteristic pattern according to claim 1, wherein, space division subscriber grouping is carried out with a greedy algorithm, according to the space directions occupied by each subscriber; for each space division subscriber group, subscribers that occupy more space directions are grouped in precedence, and then other subscribers that can be grouped are searched for according to the number of space directions occupied, in a more-to-less order; if the space directions occupied by the subscriber that is searched for currently have no overlap with the space directions occupied by any existing subscriber in the group, then that subscriber will be included into the group; the searching then continues until all space directions in the group are occupied, or all subscribers have been searched through.

7. The SDMA transmission method based on the statistical characteristic pattern according to claim 1, wherein, the special pilot signals of the subscribers can be transmitted directly in the long-time characteristic pattern, while the data signals of the subscribers can be further generated by short-time pre-coding with short-time channel information; for downlink transmission, the transmitted signals of the subscribers at the base station side are long-time pre-coded with one or more corresponding column vectors to generate transmitted signals in an antenna domain, and the signals of the same space division subscriber group in the antenna domain is the sum of the signals of the subscribers in the antenna domain; for uplink transmission, the subscriber performs matching operation for the received signals in the antenna domain at the base station side with one or more corresponding column vectors to abstract the received signals of the subscriber, and then carry out subsequent receiving operations.

8. The SDMA transmission method based on the statistical characteristic pattern according to claim 1, wherein, the signal transmission for each subscriber in the long-time statistical characteristic pattern can be carried out in all space directions occupied by the subscriber, or carried out in some space directions occupied by the subscriber; the space directions are selected from higher diagonal elements in a quantity not higher than a predefined number from the diagonal elements in the channel correlation matrix after optimal diagonalization; then, the space directions corresponding to the selected diagonal elements can be used as the space directions for signal transmission in the long-time statistical characteristic pattern; the space directions can be selected at the base station side, or selected at a subscriber terminal side, and then notified to the base station through a feedback link.

* * * * *